United States Patent
Osawa

(10) Patent No.: US 10,315,365 B2
(45) Date of Patent: Jun. 11, 2019

(54) THREE-DIMENSIONAL OBJECT MANUFACTURING METHOD, THREE-DIMENSIONAL SHAPING METHOD AND THREE-DIMENSIONAL SHAPING SYSTEM

(71) Applicant: CANON KABUSHIKI KAISHA, Tokyo (JP)

(72) Inventor: Hidefumi Osawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 15/086,462

(22) Filed: Mar. 31, 2016

(65) Prior Publication Data

US 2016/0297147 A1 Oct. 13, 2016

(30) Foreign Application Priority Data

Apr. 10, 2015 (JP) ................. 2015-081071

(51) Int. Cl.
| | |
|---|---|
| B29C 67/00 | (2017.01) |
| B29C 64/00 | (2017.01) |
| B33Y 50/00 | (2015.01) |
| G03G 15/00 | (2006.01) |
| B29C 64/141 | (2017.01) |
| B29C 64/386 | (2017.01) |
| B29C 64/40 | (2017.01) |
| B29C 64/35 | (2017.01) |
| G03G 15/22 | (2006.01) |
| B29L 22/00 | (2006.01) |

(52) U.S. Cl.
CPC ........ B29C 67/0088 (2013.01); B29C 64/141 (2017.08); B29C 64/35 (2017.08); B29C 64/386 (2017.08); B29C 64/40 (2017.08); B33Y 50/00 (2014.12); G03G 15/224 (2013.01); B29L 2022/00 (2013.01)

(58) Field of Classification Search
CPC ..... B29C 67/00; B29C 67/008; B29C 67/008; B29C 67/0088; B29C 64/00; B29C 64/30; B29C 64/38; B29C 64/38; B29C 64/386; B29C 64/10; B29C 64/14; B29C 64/14; B29C 64/141; B29C 64/35; B29C 64/40; B33Y 50/00; G03G 15/00; G05G 15/20; G05G 15/22; G05G 15/22; G05G 15/224
See application file for complete search history.

(56) References Cited

U.S. PATENT DOCUMENTS

| | | | |
|---|---|---|---|
| 2015/0231825 A1* | 8/2015 | Swartz ...................... | B32B 5/26 428/156 |
| 2015/0269290 A1* | 9/2015 | Nelaturi .............. | G06F 17/5009 703/6 |
| 2018/0022065 A1* | 1/2018 | Swartz ...................... | B32B 5/26 428/156 |

FOREIGN PATENT DOCUMENTS

JP 2004-255839 A 9/2004

* cited by examiner

*Primary Examiner* — Jacob T Minskey
*Assistant Examiner* — Matthew Hoover
(74) *Attorney, Agent, or Firm* — Venable LLP

(57) ABSTRACT

A method for manufacturing a three-dimensional object, the method comprises, a step of forming the three-dimensional object including a structure and a support body; a step of removing the support body from the three-dimensional object; wherein the step of forming the three-dimensional object comprising: a step of generating slice data of the three-dimensional object; a step of stacking a structural material constituting the structure and a support material constituting the support body based on the slice data; and the support material which is stacked based on the slice data has weakened parts dividing the support body into a plurality of parts.

13 Claims, 15 Drawing Sheets

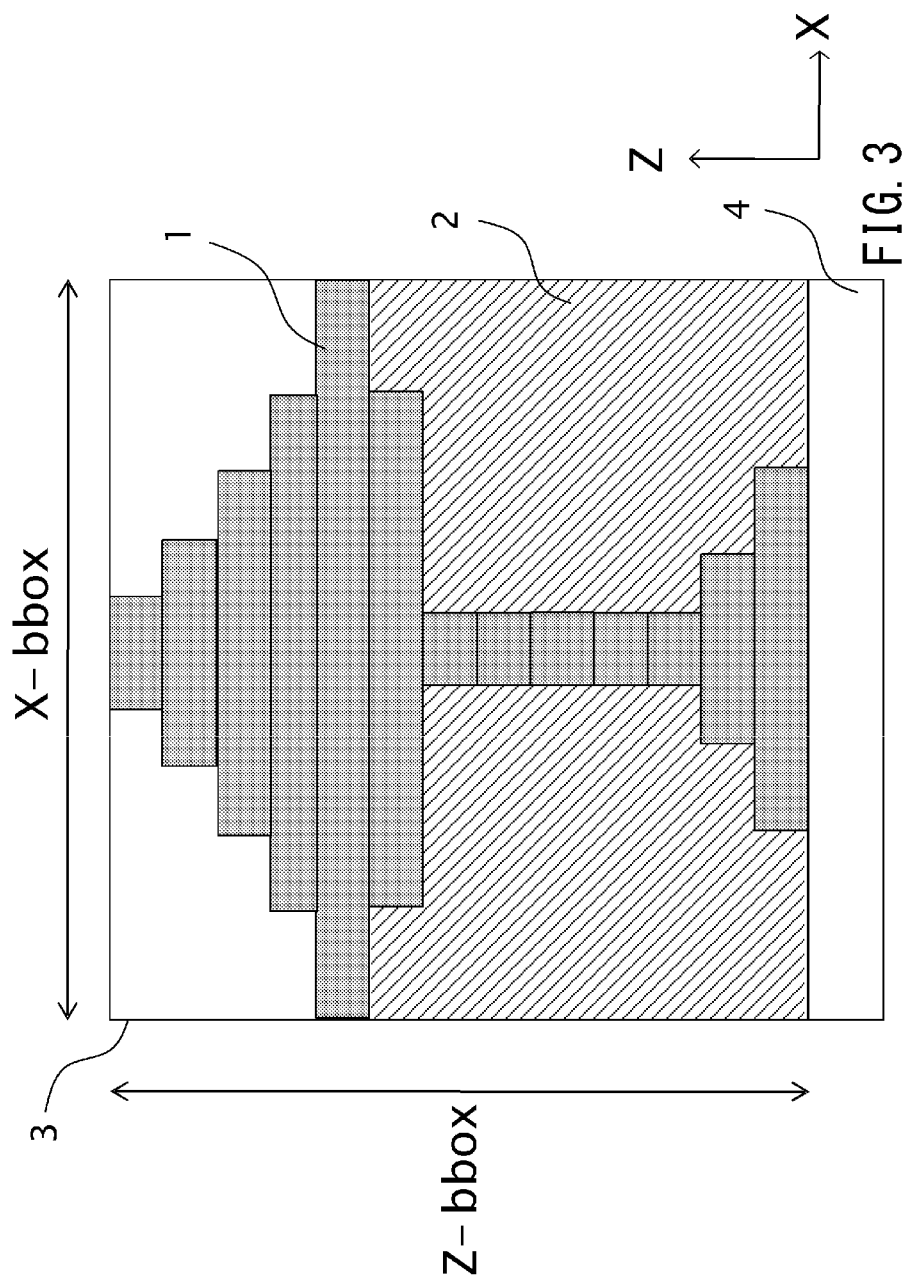

|   |   |   |   |   |   |   |   |   |
|---|---|---|---|---|---|---|---|---|
| 4 | 4 | 4 | 4 | 4 | 4 | 4 | 4 | 4 |
| 4 | 3 | 3 | 3 | 3 | 3 | 3 | 3 | 4 |
| 4 | 3 | 2 | 2 | 2 | 2 | 2 | 3 | 4 |
| 4 | 3 | 2 | 1 | 1 | 1 | 2 | 3 | 4 |
| 4 | 3 | 2 | 1 | 0 | 1 | 2 | 3 | 4 |
| 4 | 3 | 2 | 1 | 1 | 1 | 2 | 3 | 4 |
| 4 | 3 | 2 | 2 | 2 | 2 | 2 | 3 | 4 |
| 4 | 3 | 3 | 3 | 3 | 3 | 3 | 3 | 4 |
| 4 | 4 | 4 | 4 | 4 | 4 | 4 | 4 | 4 |

THREE-DIMENSIONAL OBJECT MANUFACTURING METHOD, THREE-DIMENSIONAL SHAPING METHOD AND THREE-DIMENSIONAL SHAPING SYSTEM

BACKGROUND OF THE INVENTION

1. Field of the Invention

The present invention relates to a three-dimensional object manufacturing method, a three-dimensional shaping method and a three-dimensional shaping system.

2. Description of the Related Art

There is known technology for shaping a structure, by sequentially stacking materials on the basis of cross-section (slice) data obtained by cutting a three-dimensional model in parallel planes. This technology is called a stack shaping method and is often used in test manufacture of machine components and products.

Various stack shaping methods (additive manufacturing methods) are known, but in many of the methods, it is necessary to secure the structure with a support body, in order to prevent deformation of the structure during shaping. Typical portions which require a support body in order to prevent deformation due to gravity are projecting portions (overhang sections) of the structure, or portions that are to form the upper surface of a hollow section. The support body is required to have sufficient structural strength to withstand the gravity and tension acting on the structure during shaping. When shaping is completed, the support body is removed from the structure.

A "break-out method" and a "dissolution method" are typical methods for removing a support body.

In a "break-out method", the support body is broken manually or cut up by a cutting tool and then removed. This method is often used when the structure and the support body are made from the same material. In the "dissolution" method, the support body is removed by being dissolved selectively.

One of the major issues with stack shaping technology is shortening the manufacturing time taken to obtain a desired structure. The time taken to remove the support body affects the manufacturing time, and therefore shortening the support body removal time is also an important issue.

Japanese Patent Application Publication No. 2004-255839 discloses a "dissolution method" wherein the support body can be separated easily from the structure. More specifically, the support body is made from a first support material, and a second support material which has separating properties with respect to the material constituting the first support material or structure, and the second support material is interposed at the boundary between the structure and the support body.

SUMMARY OF THE INVENTION

The method in Japanese Patent Application Publication No. 2004-255839 enables easy separation of the structure and the support body, because the material having separating properties is interposed at the boundary between the structure and the support body. However, if the structure has a complex uneven shape, then even if the support body can be separated from the surface of the structure, situations may occur where the support body and the structure mesh with each other, as in a dovetail joint, for example, and the support body cannot be extracted.

The present invention was devised in view of the circumstances described above, and an object thereof is to rapidly remove a support body from a structure after shaping, in the case of forming a shaping object including a support body and a structure.

A first embodiment of the present invention is a method for manufacturing a three-dimensional object, the method comprising, a step of forming the three-dimensional object including a structure and a support body; a step of removing the support body from the three-dimensional object; wherein the step of forming the three-dimensional object comprising: a step of generating slice data of the three-dimensional object; a step of stacking a structural material constituting the structure and a support material constituting the support body based on the slice data; and the support material which is stacked based on the slice data has weakened parts dividing the support body into a plurality of parts.

A second embodiment of the present invention is a three-dimensional shaping method for forming a three-dimensional object including a structure and a support body which supports the structure, by sequentially stacking a plurality of layers, the method includes: a step of acquiring cross-section data representing a cross-section of the structure in a target layer; a step of determining whether or not a support required region where the support body is to be provided is required in the target layer, on the basis of the cross-section data of the structure in the target layer, and a shape of the structure formed after the target layer; and a generation step of, when it is determined that a support required region is required in the target layer, generating support body cross-section data representing a cross-section of a support body arranged in the support required region, and generating slice data of the target layer by adding the support body cross-section data of the support body to the cross-section data of the structure, and in order to divide the support body into plural parts by weakened parts, support body cross-section data is generated in the generation step, the support body cross-section data including a cross-section part corresponding to the cross-section of the plural parts, and a cross-section part corresponding to the cross-section of the weakened parts.

A third embodiment of the present invention is a three-dimensional shaping system for forming a three-dimensional object including a structure and a support body which supports the structure, by sequentially stacking a plurality of layers, the system comprising slice data generation means for generating slice data used in forming the layers, wherein the slice data generation means including: acquisition means for acquiring cross-section data representing a cross-section of the structure in a target layer; determination means for determining whether or not a support required region where the support body is to be provided is required in the target layer, on the basis of the cross-section data of the structure in the target layer, and a shape of the structure formed after the target layer; and generation means for, when it is determined that a support required region is required in the target layer, generating support body cross-section data representing a cross-section of a support body arranged in the support required region, and generating slice data of the target layer by adding the support body cross-section data of the support body to the cross-section data of the structure, and in order to configure the support body from portions formed of a plurality of first support structures, and portions formed of second support structures which are weaker than the first support structures and which connect together the portions formed of the plurality of first support structures, the generation means generates support body cross-section data which includes a first support structure cross-section part corresponding to the cross-section of the portions formed of the plurality of first support structures, and a second support structure cross-section part corresponding to the cross-section of the portions formed of the second support structures.

A fourth embodiment of the present invention is an information processing method for generating slice data for use in forming respective layers in a three-dimensional shaping device which forms a three-dimensional shaping object including a structure and a support part which supports the structure, by sequentially stacking a plurality of layers in one direction, the method including: a step of acquiring cross-section data representing a cross-section of the structure in a target layer, in order to generate slice data of the target layer; a step of determining whether or not a support required region where a support body for supporting the structure is to be provided is required in the target layer, on the basis of the cross-section data of the structure in the target layer, and a shape of the structure situated on top of the target layer; and a generation step of, when it is determined that a support required region is required in the target layer, generating support body cross-section data representing a cross-section of a support body arranged in the support required region, and generating slice data of the target layer by adding the support body cross-section data of the support body to the cross-section data of the structure, wherein, in order to divide the support body into a plurality of divided bodies when removing the support body from the structure, support body cross-section data is generated in the generation step, the support body cross-section data including a divided body cross-section part corresponding to the cross-section of the divided bodies, and a weakened part cross-sectional part corresponding to the cross-section of weakened parts which connect together the adjacent divided bodies, of the plurality of divided bodies and which have a weaker structure than the divided bodies.

A fifth embodiment of the invention is an information processing device which generates slice data for use in forming respective layers in a three-dimensional shaping device which forms a three-dimensional shaping object including a structure and a support part, by sequentially stacking a plurality of layers, the device including: acquiring means for acquiring cross-section data representing a cross-section of the structure in a target layer, in order to generate slice data of the target layer; determination means for determining whether or not a support required region where a support body for supporting the structure is to be provided is required in the target layer, on the basis of the cross-section data of the structure in the target layer, and a shape of the structure situated on top of the target layer; and generation means for, when it is determined that a support required region is required in the target layer, generating support body cross-section data representing a cross-section of a support body arranged in the support required region, and generating slice data of the target layer by adding the support body cross-section data of the support body to the cross-section data of the structure, wherein, in order to divide the support body into a plurality of divided bodies when removing the support body from the structure, the generation means generates support body cross-section data which includes a divided body cross-section part corresponding to the cross-section of the divided bodies, and a weakened part cross-sectional part corresponding to the cross-section of weakened parts which connect together the adjacent divided bodies, of the plurality of divided bodies, and which have a weaker structure than the divided bodies.

A sixth embodiment of the present invention is a non-transitory computer readable storage medium, on which a program that causes a computer to execute the respective steps of the information processing method described above is recorded.

According to the present invention, when forming a shaping object including a support body and a structure, it is possible to remove the support body more rapidly from the formed structure.

Further features of the present invention will become apparent from the following description of exemplary embodiments with reference to the attached drawings.

BRIEF DESCRIPTION OF THE DRAWINGS

FIG. 3 is a diagram showing an umbrella-shaped structure, which is one example of a structure according to the first embodiment;

FIGS. 4A and 4B are diagrams for illustrating a method for creating a distance map according to a first embodiment;

DESCRIPTION OF THE EMBODIMENTS

Below, embodiments of the present invention are described with reference to the drawings. The embodiments described below give examples of the actual implementation of the present invention, and it is not intended to limit the range of the present invention to the embodiments indicated below.

First Embodiment

Below, a first embodiment is described.

Figure 1:
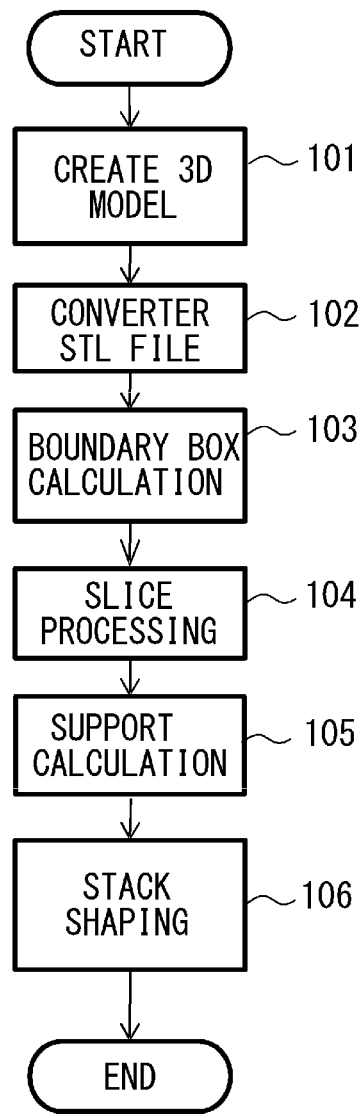
FIG. 1 is a diagram showing an overall processing flow when forming a shaping object in a three-dimensional shaping system according to a first embodiment.

FIG. 1 a diagram showing an overall processing flow when forming a shaping object in a three-dimensional shaping system of the present invention, which forms a three-dimensional shaping object (three-dimensional object) including a structure and a support body by sequentially stacking a plurality of layers in one direction. This process is executed by an information processing system that is incorporated into the three-dimensional shaping system, or that is used by connecting to the three-dimensional shaping system.

In FIG. 1, step 101 is a modelling step for 3D data of the structure. Modelling means creating a model and parts of the shaping object by using three-dimensional modelling software, such as 3D-CAD, 3D-CG, 3D-Scanner, and the like. Here, the data is created and saved in a file format corresponding to the three-dimensional modelling software used.

Step 102 is a step of converting the data created in the modelling step, to a stereo lithography (STL) format. STL is a well-known format for representing three-dimensional shapes, which has been used conventionally in optical shaping devices, and the like, and which represents the surface of a structure as a triangular shape. The data is the three vertical coordinate values (X, Y, Z) and the normal vector (N) of the triangular plane.

Step 103 is a step of determining a boundary box (bounding box). The boundary box is a virtual box (boundary frame) constituted by a circumscribing rectangle which surrounds the whole of the structure. The method for calculating the boundary box is described below with reference to FIG. 2.

Step 104 is a slice processing step of acquiring cross-section data which is data representing a cross-section of the structure in a target layer in the boundary box, in order to generate slice data for the target layer, which is a layer that is the object of data generation at a particular time. Here, the slice data is data that is used to form a shaping object.

This step is a step of calculating the cross-sectional shape of the structure represented by STL, when the structure is cut in the XY plane perpendicular to the stacking direction (Z direction). In this step, basically, a binary bit map image representing the inside and outside of the structure is obtained as cross-section data.

Step 105 is a support calculation step. Although the details are described below, this process involves generating cross-section data (support body cross-section data) representing the cross-section of a support body to be disposed in a region where support is required when forming the structure (support required region).

In this case, in the present embodiment, weakened parts are provided for the purpose of dividing the support body into a plurality of divided bodies and removing the support body when removing the support body from the structure after forming a shaping object including the structure and the support body. Slice data for the target layer is generated by adding the generated support body cross-section data to the cross-section data for the structure in the target layer.

Step 106 is a stack shaping step of forming respective layers using the slice data, and involves creating a shaping object by stacking layers sequentially in the Z direction, from the layer corresponding to the minimum value Z min of the Z coordinate.

Here, "structure" means a portion forming a shape of a three-dimensional model, and "shaping object" means an object created by a three-dimensional shaping system, which includes a structure and a support body.

In the present embodiment, a method is described in which slice data is generated sequentially from top to bottom, the slice data is spooled and layers are stacked from bottom to top, but the method is not limited to this.

Below, a method for calculating a boundary box in step 103 in FIG. 1 will be described.

Figure 2:
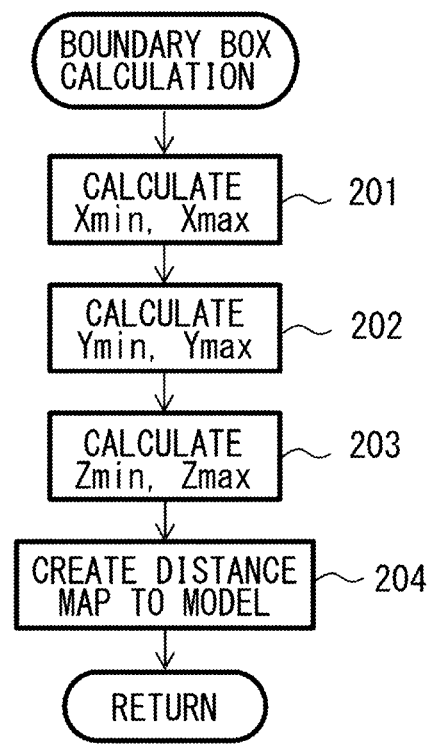
FIG. 2 is a flowchart for calculating a boundary box according to the first embodiment.

FIG. 2 is a flowchart for calculating a boundary box.

In step 201, the minimum value Xmin and the maximum value Xmax of the X coordinate are determined from the coordinate values of the STL triangular shape data. Furthermore, in step 202, the minimum value Ymin and the maximum value Ymax of the Y coordinates are determined. Moreover, in step 203, the minimum value Zmin and the maximum value Zmax of the Z coordinates are determined. This is the basic information of the boundary box. Furthermore, in step 204, a distance map representing the distance from the upper surface of the boundary box to the structure is created. This feature is described below with reference to FIGS. 4A and 4B.

FIG. 3 is a diagram showing an umbrella-shaped structure 1, which is one example of a structure according to the present embodiment.

The boundary box 3 of this structure 1 is a cuboid which surrounds the whole of the structure, and has three edge lengths: X-bbox, Y-bbox, Z-bbox. The lengths of the respective edges are calculated by X-bbox=Xmax−Xmin, Y-bbox=Ymax−Ymin, Z-bbox=Zmax−Zmin.

Here, the overhang sections of the umbrella shape in the diagram are sections where there is a concern that the structure 1 will deform or that the stacking will not be finished correctly if the sections are not supported by anything.

The support required region which needs to be supported during forming of the structure 1 is indicated by diagonal hatching in FIG. 3. In the present embodiment, a support body 2 is formed below the region where a support body is required, in other words, the overhang sections of the umbrella shape.

FIG. 4A and FIG. 4B are diagrams for illustrating a method for creating a distance map which represents the distance from the upper surface of the boundary box to the structure 1.

The method for creating a distance map is described below. Firstly, as shown in FIG. 4A, the distance until a light ray strikes the upper surface of the structure is calculated, considering a state where a light ray (virtual ray) is emitted from the upper surface of the boundary box 3. The calculation values in this case are stored for each pixel in the XY plane, and a distance map such as that in FIG. 4B is created.

By using a distance map of this kind, it is possible to determine whether the height of each pixel of the target layer is lower or higher than the upper surface of the structure.

If it can be determined whether the height of each pixel of the target layer is lower or higher than the upper surface of the structure, then when creating slice data, it is possible to decide whether the portion apart from the structure, in the cross-section data representing the cross-section of the structure in the target layer, is to be set as a support body or an no material.

Below, the support calculation step in step 105 of FIG. 1 will be described.

Figure 5:
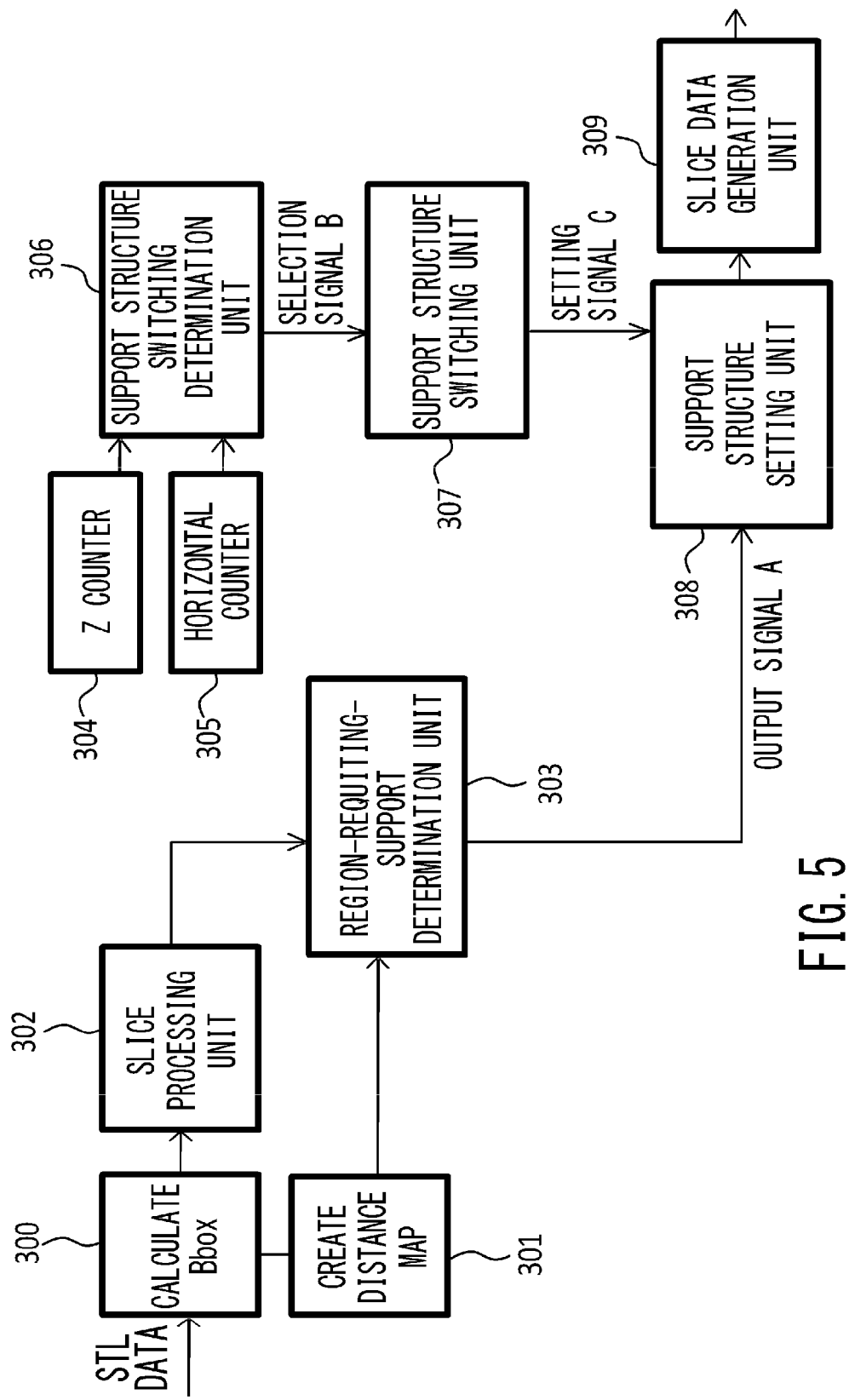
FIG. 5 is a block diagram for describing a process when forming a shaping object according to the first embodiment.

FIG. 5 is a block diagram for describing a process for forming a shaping object according to the present embodiment.

A boundary box 3 is calculated from the input STL data in the boundary box (Bbox) calculation unit 300, and a distance map is then created in the distance map creation unit 301.

Figure 9:
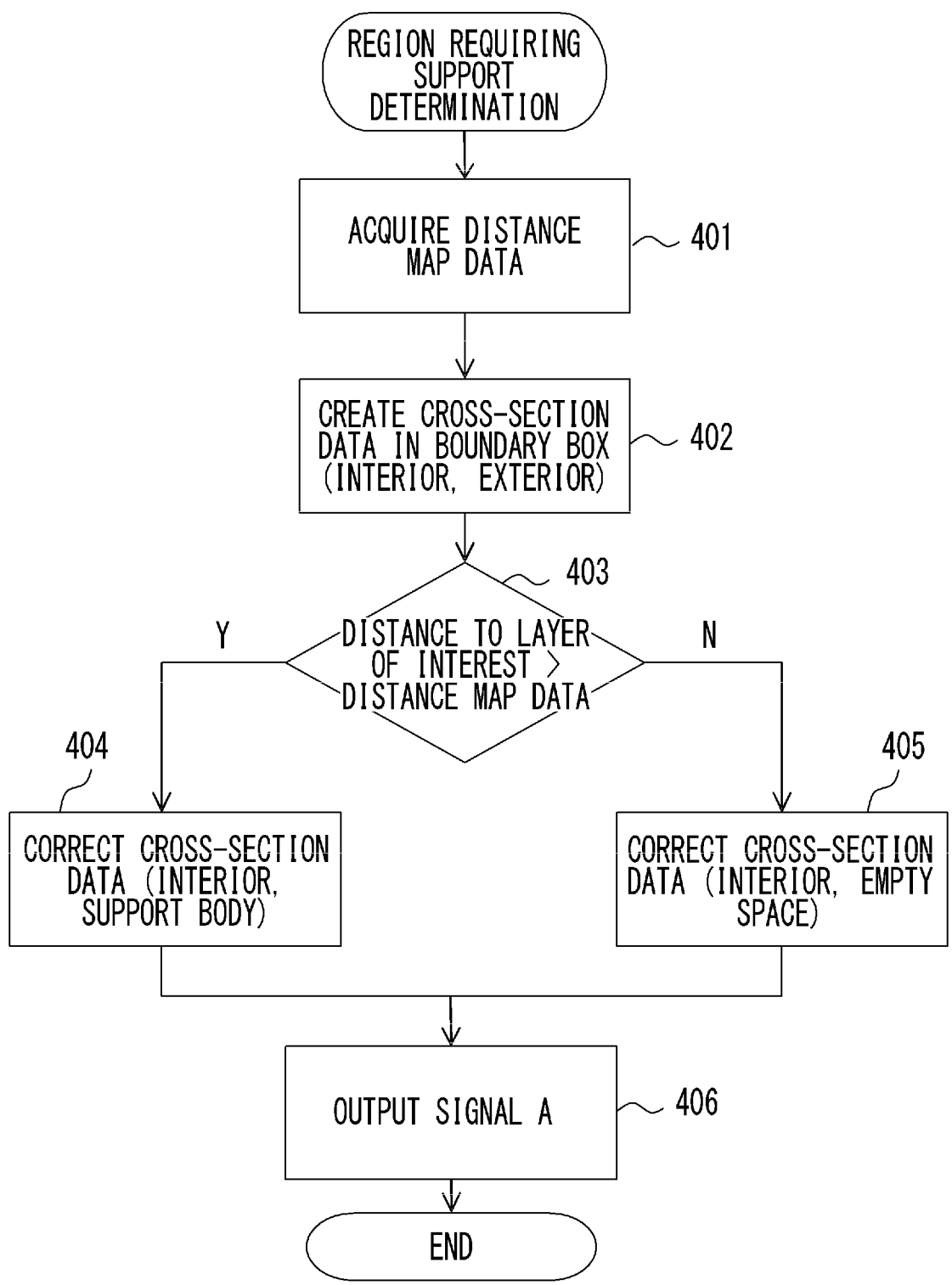
FIG. 9 is a flowchart showing processing for determining the presence or absence of a support required region according to the first embodiment.

In a support-required-region determination unit 303, the data of the distance map created by the distance map creation unit 301 is used to make determinations based on the flowchart in FIG. 9, in respect of the cross-section data that has been sliced by the slice processing unit 302.

In the support-required-region determination unit 303, by this determination process, it is decided whether the portion apart from the structure is to be a support body or an no material, and an output signal A in which the portion other than the structure is set to "no material" or "support body" is output in the cross-section data of the target layer. The output signal A corresponding to the cross-section data of the target layer in the structure 1 of the present embodiment shown in FIG. 3 includes data for at least the "structure", from among the "no material", "support body" and "structure".

The length of the support required region which continues in the Z direction and is counted by the Z counter 304, and the length in the horizontal direction from the reference position of the support required region which is counted by the horizontal counter 305, are input to a support structure switching determination unit 306.

The support structure switching determination unit 306, by making a determination based on the flowcharts in FIG. 10A and FIG. 11 described below, outputs a selection signal B whereby a support structure corresponding to the determination made is selected from among a plurality of set support structures, to the support structure switching unit 307.

As described above, in the present embodiment, a configuration is adopted in which the support body 2 is removed from the structure 1 by being divided into a plurality of divided bodies. In this case, in the present embodiment, by adopting a structure in which weakened parts which are to be cutting lines are inserted into the support body 2, a configuration is achieved in which the support body 2 can be divided into a plurality of divided bodies; this feature is described below with reference to FIG. 6, FIGS. 7A to 7D, and FIGS. 8A to 8C.

The support structure switching unit 307 selects the support structure in accordance with the selection signal B; this feature is described below with reference to the block diagram in FIG. 12.

The support structure switching unit 307 outputs the setting signal C to the support structure setting unit 308 in such a manner that the selected support structure is set.

The support structure setting unit 308 sets the support structure set by the support structure switching unit 307 in accordance with the setting signal C, for the region of the "support body" included in the output signal A (support required region).

The slice data generation unit 309 generates slice data for the target layer, in which the support body cross-section data of the support body 2 is added to the cross-section data of the structure 1.

Figure 6:
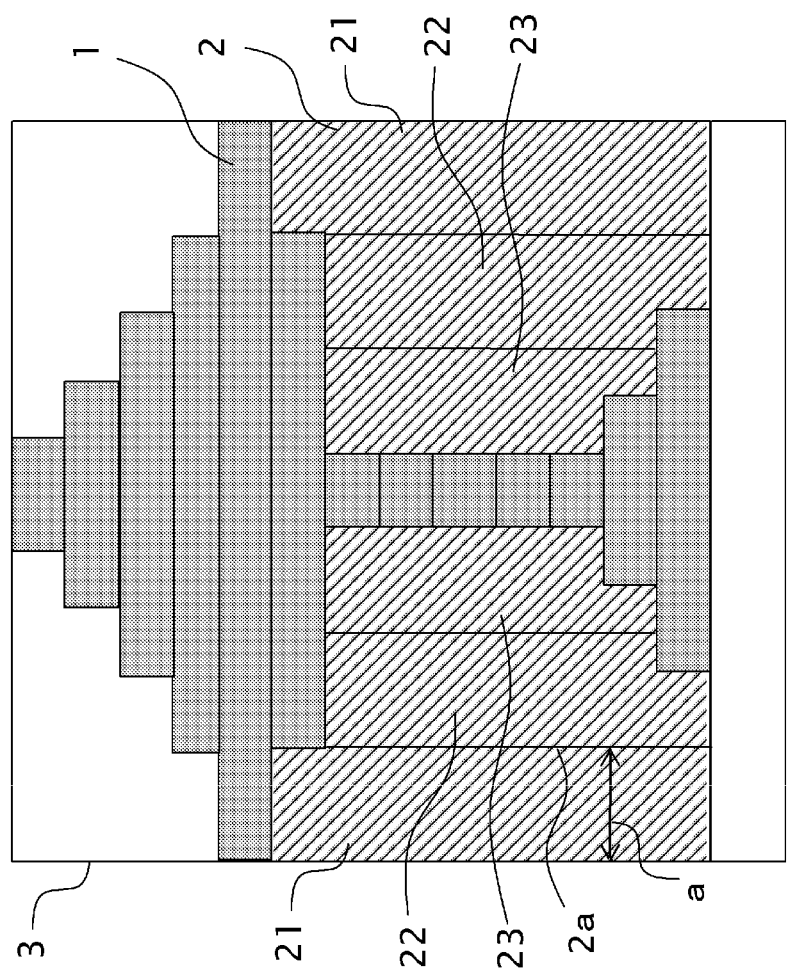
FIG. 6 is a diagram illustrating a method for inserting cutting lines at prescribed intervals in the support body according to a first embodiment.

FIG. 6 is a diagram illustrating a method for inserting cutting lines in the support body 2 at predetermined intervals a.

As shown in FIG. 6, by adopting a structure for the support body 2 in which weakened parts (cutting lines) 2a are provided at respective intervals a from the left side surface of the boundary box 3, which is a reference position, the support body 2 can be divided into a plurality of divided bodies, at intervals a from the left side surface of the boundary box 3. Here, the interval a is the interval between mutually adjacent weakened parts 2a in the support body 2. Furthermore, the interval a may be set appropriately in accordance with the type of material of the support body 2 and the type of support structure. The characteristics of the material constituting the support body (support material) are that it can be removed by dissolving in a solvent, or that is can be removed manually, for instance.

In the present embodiment, the divided bodies of the support body 2 divided in this way are the divided body 21, the divided body 22 and the divided body 23, from the outside towards the inside.

FIGS. 7A to 7D are diagrams for illustrating the support structure, focusing on the support body 2 which is positioned on the side of the structure 1. In the present embodiment, a case where a hanging beam structure is adopted is described as one example of a support structure. For the support material used in this case, a material having high solubility in a solvent that does not dissolve the material constituting the structure (structural material) is used.

Figure 7A:
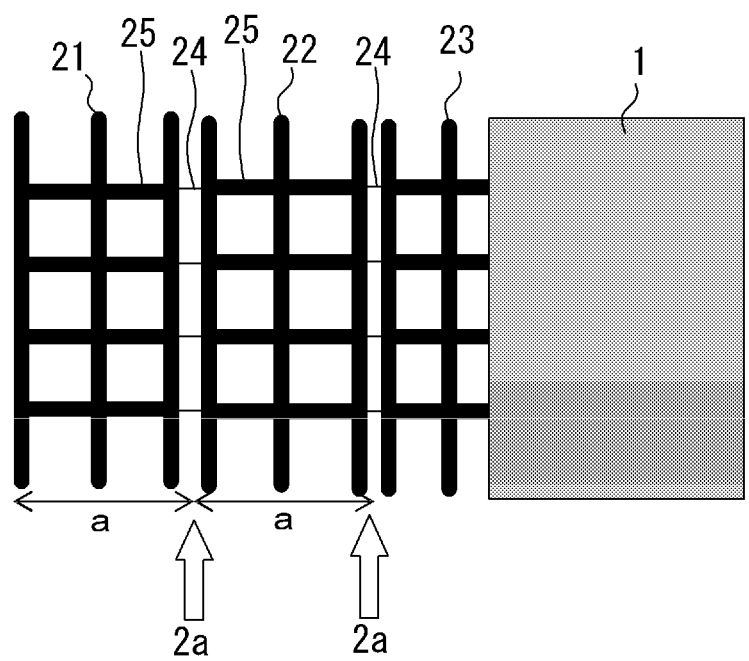
FIGS. 7A to 7D are diagrams for illustrating a support structure on the side of a structure according to a first embodiment.

In FIG. 7A, the support body 2 is depicted as having a ladder shape, and FIG. 7A shows a depiction of the support body 2 having a hanging beam structure as viewed from the side.

As shown in FIG. 7A, bridges of two types, thin bridges (beams) 24 and thick bridges 25, are provided on the support body 2 having a hanging beam structure, so as to extend respectively in the horizontal direction.

In the present embodiment, of the bridges 24 and 25 of two types, the bridges 24 constitute weakened parts (cutting lines) 2a, and the bridges 24 are arranged at intervals a in the horizontal direction, as shown in FIG. 7A.

In other words, in the present embodiment, the divided bodies 21, 22, 23 are formed by the bridges 25, and the divided bodies are connected to each other by the bridges 24 which have a weaker structure than the bridges 25.

In this case, in the present embodiment, as shown in FIG. 7A, by making the thickness of the bridges 24 smaller than the thickness of the bridges 25, the bridges 24 are made to form a weakened structure which has a lower strength and is dissolved more readily in solvent, than the bridges 25.

In this way, by arranging the bridges 24 which have lower strength and are more easily dissolved in solvent than the bridges 25, inside the support body 2, the bridges 24 are given the function of cutting lines in the support body 2. By configuring the support body 2 in this way, when the structure is brought into contact with the solvent after the shaping object has been formed in the stack shaping step, then the bridges 24 dissolve before the bridges 25, and the support body 2 is divided into a plurality of divided bodies which configure the bridges 25.

Here, when slice data for a target layer is generated, the support body cross-section data is generated in such a manner that the thin bridges 24 are arranged between the adjacent divided bodies at intervals a, from the side surface of the boundary box 3, as a structure of weakened parts (cutting lines) in the support body 2. This support body cross-section data includes a weakened part cross-section corresponding to the cross-section of the thin bridges 24 (a second support structure cross-section), and a divided body cross-section corresponding to the cross-section of each divided body (a first support structure cross-section).

There are no particular restrictions on the structure of the bridges 24, 25, which may respectively be set as appropriate, taking account of the bending force, shearing force, and the like. Furthermore, the same structure does not have to be adopted for the bridges 24 and the bridges 25.

Figure 7B:
Figure 7C:
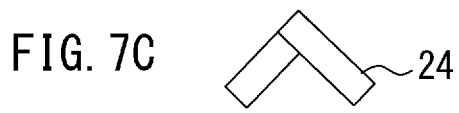
Figure 7D:
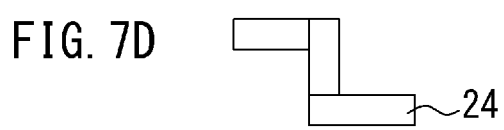

FIG. 7B to FIG. 7D show various modes of the bridges 24.

FIG. 7B shows a simple flat plate structure, FIG. 7C shows a roof-shaped structure, and FIG. 7D shows a Z-shaped structure. In this way, various modes are possible for the bridges.

Figure 8A:
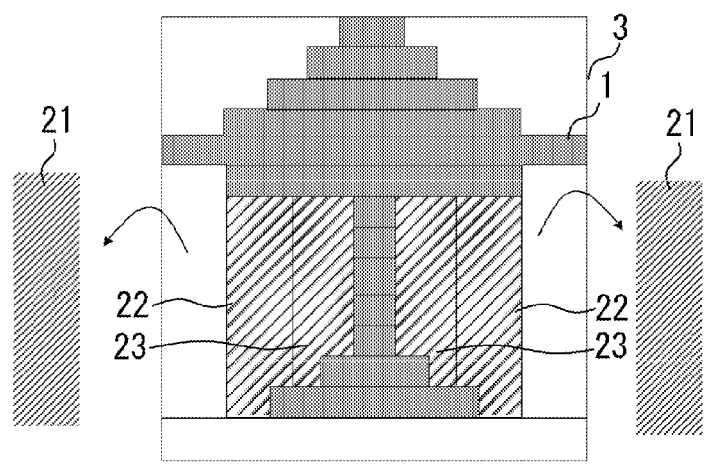
FIGS. 8A to 8C are diagrams for illustrating a process of dividing the support body according to the first embodiment.
Figure 8B:
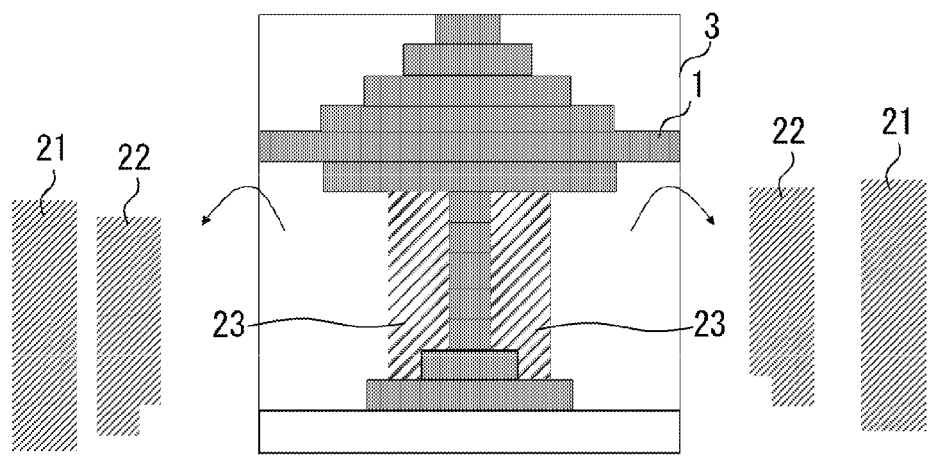
Figure 8C:
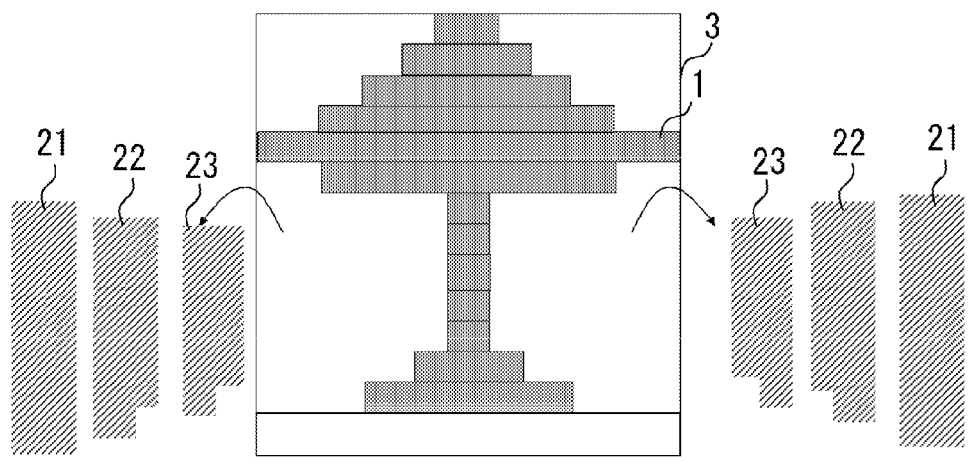

FIGS. 8A to 8C are diagrams for illustrating the process of dividing the support body 2.

FIGS. 8A to 8C show a case in which the thin bridges 24 arranged between the mutually adjacent divided bodies are dissolved by bringing the bridges 24 into contact with a solvent, and the divided bodies constituted by the thick bridges 25, on the outer side of the thin bridges 24, are separated from the main body of the support body.

FIG. 8A shows a state where the thin bridges 24 have been dissolved by bringing a solvent into contact with the thin bridges 24 between the divided body 21 situated on the outermost side of the support body 2, and the divided body 22 adjacent to the divided body 21, and the divided body 21 has been separated from the support body main body. FIG. 8B shows a state where the thin bridges 24 have been dissolved by bringing a solvent into contact with the thin bridges 24 between the divided body 22, which is now situated on the outermost side due to the separation of the divided body 21, and the divided body 23 adjacent to the divided body 22, and the divided body 22 has been separated from the support body main body. FIG. 8C shows a state where the divided body 23 which was situated on the innermost side of the support body 2 has been separated from the structure 1.

In the present embodiment, in this way, a process is repeated in which the thin bridges 24 which connect the divided body situated on the outermost side of the support body 2, with the adjacent divided body, are dissolved and the outermost divided body is progressively separated from the support body main body.

Therefore, the solvent reaches in between the structure 1 and the divided body 23 at an earlier stage, and the structure 1 and the support body 2 can be separated, even of the support body 2 has not dissolved completely.

Consequently, it is possible to extract the structure at an earlier stage, when the support body has not yet dissolved completely. If part of the support body is left on the surface of the structure when extracted, then it is sufficient to carry out post-processing that involves washing with a solvent which selectively dissolves the support body remaining on the surface of the structure.

FIG. 9 is a flowchart showing processing for determining the presence or absence of a support required region.

In step 401, the distance map data shown in FIG. 4B is acquired.

Next, in step 402, binary cross-section data indicating the interior or exterior of the structure is created, as cross-section data for the target layer within the boundary box.

Next, in step 403, the position of the target layer and the distance map data are compared. Here, the distance from the upper surface of the boundary box to the target layer is compared with the distance map data. If the result of step 403 is YES, in other words, if the distance from the upper surface of the boundary box to the target layer is greater than the data in the distance map, then it is determined that there is a support required region. If the cross-section data for the target layer in this case includes data indicating the exterior of the structure, then in step 404, the data indicating the exterior of the structure is corrected to data indicating a support body (support body cross-section data). In other words, the cross-section data for the target layer is corrected to binary data indicating the interior of the structure and the support body. If the cross-section data for the target layer does not include data indicating the exterior of the structure, then the cross-section data for the target layer is left unchanged as data indicating the interior of the structure. If the result of step 403 is NO, then it is determined that there is no support required region, and in step 405, the cross-section data for the target layer is left unchanged as binary data indicating the interior and exterior (no material) of the structure.

In step 406, the data obtained in step 404 or the data obtained in step 405 is output as an output signal A.

Figure 10A:
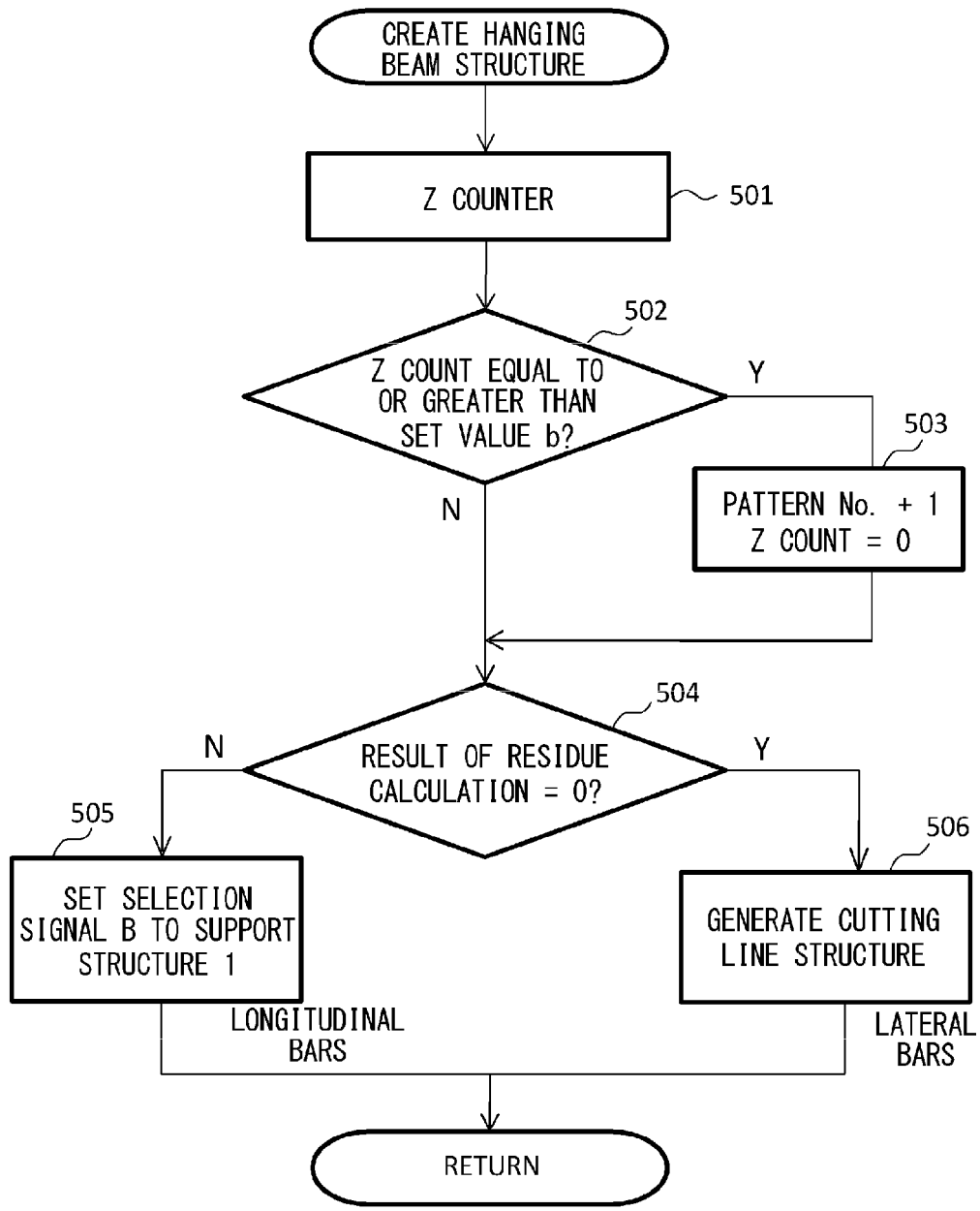
FIG. 10A and FIG. 10B are flowcharts showing processing for creating a hanging beam structure according to the first embodiment.

FIG. 10A is a flowchart showing a process for setting a selection signal in order to create a hanging beam structure.

In step 501, the Z direction of the cross-section data is counted by the Z counter 304.

Figure 10B:
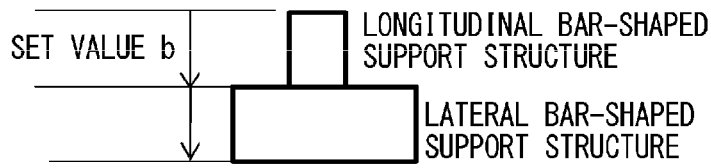

In step 502, if the count value of the Z counter 304 is equal to or greater than the set value b, then the arrangement pattern (bar orientation) in the XY plane is switched so as to toggle between longitudinal bars and lateral bars (FIG. 10B).

Therefore, a counter for the pattern number is prepared, and is incremented by one in step 503. In step 503, furthermore, the Z counter 304 is reset to zero in order to switch to the next pattern.

In step 504, a residue calculation is carried out to divide the pattern number by two, and it is determined whether the pattern number is an odd number or an even number. If the result of the residue calculation is 1 (odd number), then the procedure advances to step 505, and the selection signal B is set so as to select a longitudinal bar-shaped support structure 1. Furthermore, if the result of the residue calculation is zero (even number), then the procedure advances to step 506, and a lateral bar-shaped support structure is chosen. In this case, the cutting line (weakened part) structure is inserted into the lateral bar-shaped support structure, according to requirements. This feature is described here with reference to FIG. 11.

Figure 11:
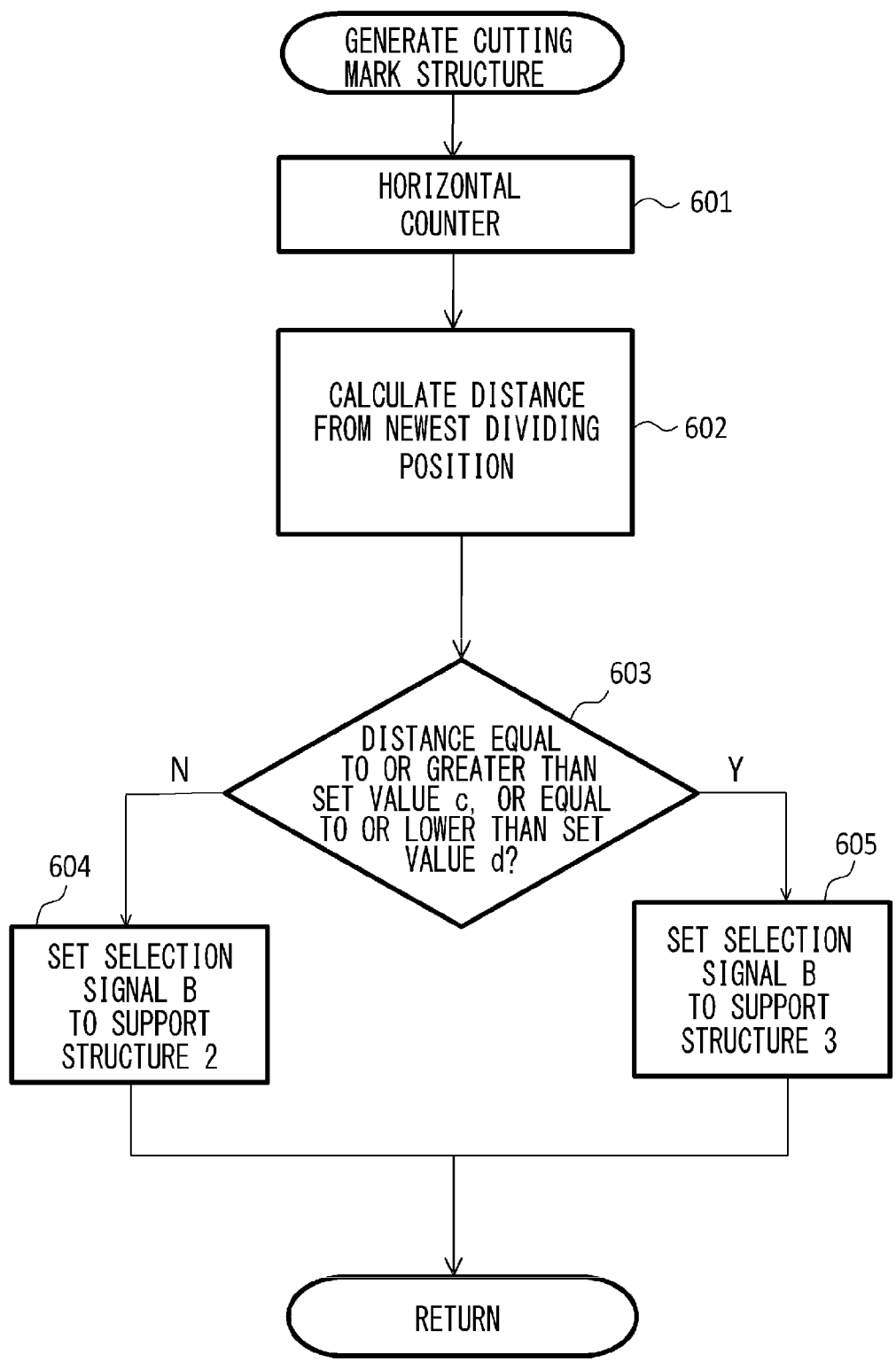
FIG. 11 is a flowchart showing processing for creating a cutting line structure according to the first embodiment.

FIG. 11 is a flowchart showing a switching and setting process for creating a cutting line structure.

In step 601, the length of the cross-section data in the horizontal direction is counted by the horizontal counter 305.

In step 602, the distance in the horizontal direction from the side surface of the boundary box, or the newest cutting edge structure that has been created, to the position of interest, is calculated.

In step 603, it is determined whether or not the distance calculated in step 602 is equal to or greater than a set value c, or is equal to or lower than a set value d. Here, the set value c is a value corresponding to the width of one divided body in the horizontal direction, which is equivalent to the interval a at which the cutting lines (weakened parts 2a) are made. Furthermore, the set value d corresponds to the width of one divided body in the horizontal direction, plus the width of the actual weakened part 2a (width of thin bridges 24). When the result of step 603 is NO, then the procedure advances to step 604 and the selection signal B is set so as to choose a thick lateral bar-shaped support structure 2. When the result of step 603 is YES, then the procedure advances to step 605 and the selection signal B is set so as to choose a thin lateral bar-shaped support structure 3.

Figure 12:
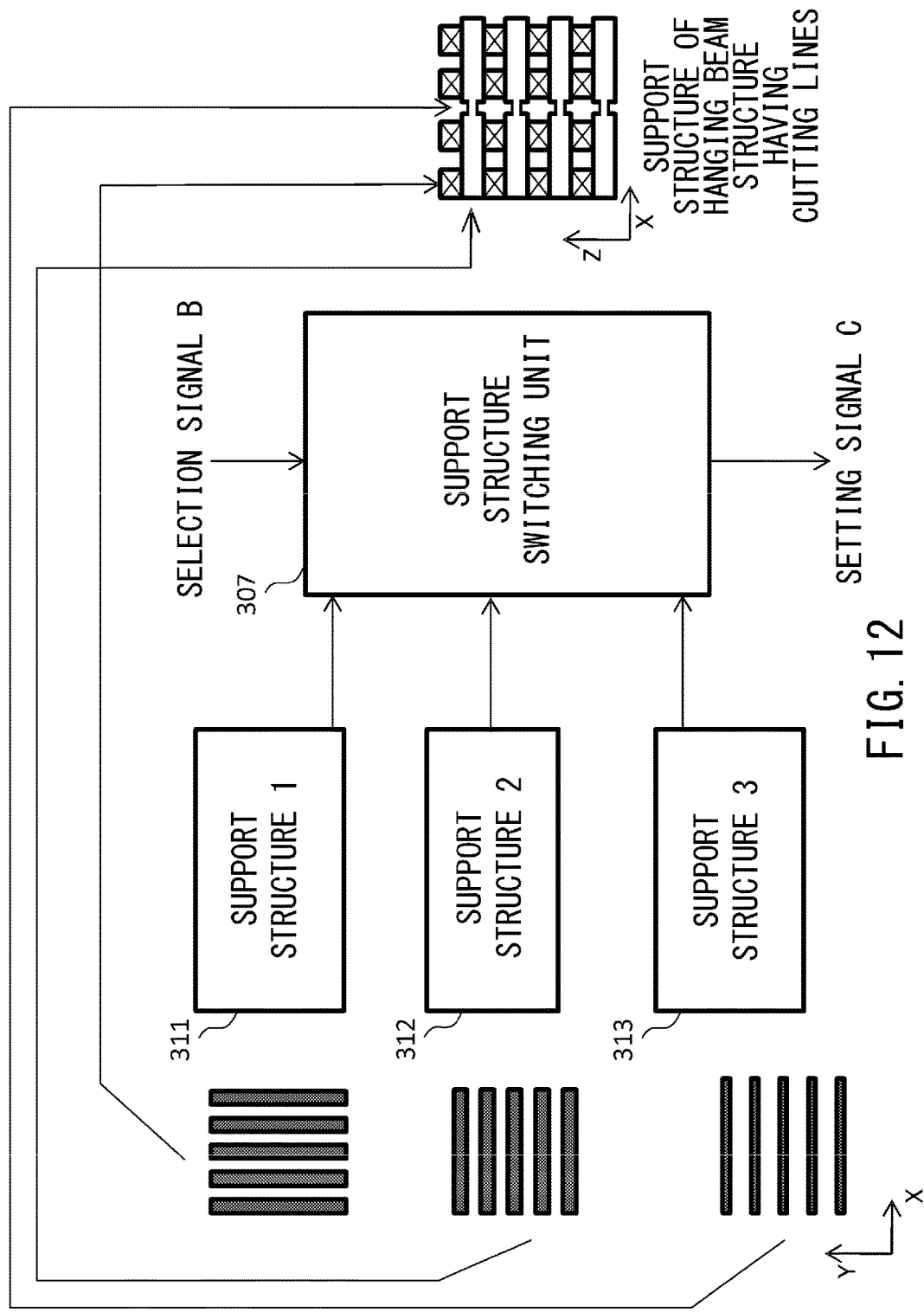
FIG. 12 is a block diagram of a support structure switching unit according to a first embodiment.

FIG. 12 is a block diagram of a support structure switching unit.

311 is a first pattern generator for a longitudinal bar-shaped support structure 1, 312 is a second pattern generator for a lateral bar-shaped support structure 2, which is a thick bridge structure, and 313 is a third pattern generator for a lateral bar-shaped support structure 3, which is a thin bridge structure.

The pattern generators generate pixels creating a pattern of a support structure, by using an internal counter. When the operation of the first pattern generator 311 is started, a longitudinal bar-shaped support structure 1 is created by the first pattern generator 311 generating pixels creating a pattern for the support structure 1, until the counter value of the Z counter 304 reaches the set value b.

When the counter value of the Z counter 304 becomes the set value b, and the support required region continues, then the support structure is switched and a lateral bar-shaped support structure is formed by the second pattern generator 312 or the third pattern generator 313.

In this case, if the distance calculated using the horizontal counter is smaller than the set value c, as described with reference to FIG. 11, then the support structure 2, which is the thick bridge structure, is generated by the second pattern generator 312. If the calculated distance is equal to or greater than the set value c, or is equal to or lower than the set value d, then the support structure 3, which is the narrow bridge structure, is formed by the third pattern generator 313.

In the support structure switching unit 307, the structure of the support body is set to any one of the support structure 1, the support structure 2 and the support structure 3, in accordance with the selection signal B, and the setting signal C is output to the support structure setting unit 308.

As described above, in the present embodiment, a configuration is adopted in which, after the shaping object has been formed, the support body 2 is divided into a plurality of divided parts and removed from the structure 1. Consequently, when the support body 2 is removed from the structure 1 by solvent after the shaping object has been formed, it is possible to separate the structure 1 and the support body 2, even when the support body 2 has not dissolved completely.

Therefore, it is possible to extract the structure 1 at an earlier stage, when the support body 2 has not yet dissolved completely, and the support body 2 can be extracted more rapidly from the structure 1 after shaping. In other words, it is possible to greatly shorten the shaping time required to form the structure 1.

In the present embodiment, a mode has been described in which the support body 2 is removed from the structure 1 by solvent after a shaping object has been formed, but the method for removing the support body 2 from the structure 1 is not limited to a dissolution method. The present invention can also be applied appropriately to a mode in which the support body 2 is removed from the structure 1 by a break-out method.

Furthermore, in the present embodiment, by making the narrow bridges 24 narrower than the thick bridges 25, the strength of the narrow bridges 24 is made lower than that of the thick bridges 25, and the narrow bridges 24 are dissolved more easily in solvent, but the invention is not limited to this. It is also possible to make the bridges 24 and the bridges 25 from materials having respectively different characteristics, and to form the bridges 24 and the bridges 25 to the same thickness, provided that the bridges 24 are configured so as to have lower strength and to be dissolved more readily by solvent, than the bridges 25.

In this way, the supporting material is not limited to one type, and the support body may be configured by materials of a plurality of types having different characteristics. The materials of a plurality of types include materials of different material types and material of different colors. In the support body configured by the divided bodies and weakened parts, the material of the divided bodies and weakened parts, and the support structure thereof, may be set in accordance with the arrangement positions of the divided bodies and weakened parts with respect to the structure.

Furthermore, in the present embodiment, a case is described in which a hanging beam structure using support structures of three types is employed as the support structure of the support body 2, but the invention is not limited to this. The support structure of the support body 2 may also employ a hanging beam structure using support structures of four or more types. Furthermore, the support structure is not limited to a hanging beam structure, provided that the support body 2 is configured so as to be removed from the structure 1 by being divided into a plurality of divided bodies, after the shaping object has been formed. The hanging beam structure is desirable, since the amount of supporting material used can be reduced.

Second Embodiment

Below, a second embodiment is described. In the present embodiment, the configuration and/or processes which are different to the first embodiment are described, and the functions and/or processes that are the same as the first embodiment are not described.

FIGS. 13A to 13D are schematic cross-sectional diagrams showing a structure 11 having a hollow chamber 12 in which the interior has been cut away by a hollowing process.

In the present embodiment, a structure 11 having a simplified composition is described, for the sake of convenience, but there are no particular restrictions on the shape of the structure, provided that the shape has a hollow chamber. The present embodiment can also be applied to the structure 1 of the first embodiment, provided that the structure has a hollow chamber.

Figure 13A:
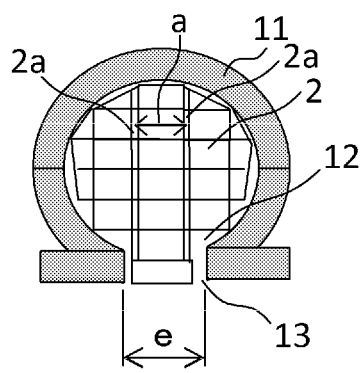
FIG. 13A to FIG. 13D are schematic cross-sectional diagrams showing a structure according to a second embodiment.

When forming the structure 11 as shown in FIG. 13A, the support body 2 is arranged and stacked inside the hollow chamber 12, but in a mode of this kind, it is necessary to rapidly dissolve and remove the support body 2 inside the hollow chamber after forming the structure.

Therefore, in the present embodiment, the interval a between the weakened parts (cutting lines) 2a of the support body 2 is set so as to be equal to or less than the diameter (opening width) e of the exit hole (opening) 13 provided in the hollow chamber 12. The interval a between the weakened parts 2a of the support body 2 is substantially equal to the width f of the divided bodies (blocks) 26 of the support body 2 in FIG. 13C.

Figure 13B:
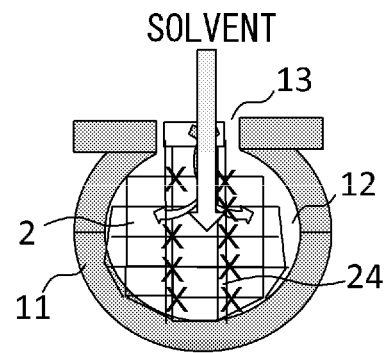
Figure 13C:
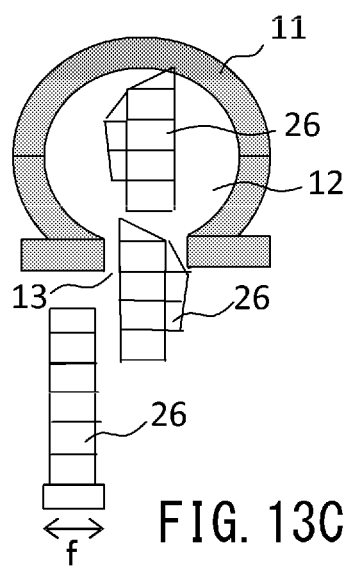

By causing the solvent to flow into the hollow chamber 12 and rapidly dissolve the narrow bridges 24, as shown in FIG. 13B, it is possible to divide the support body 2 into a plurality of divided bodies 26. By this means, as shown in FIG. 13C, it is possible to extract the divided bodies 26 via the exit hole 13 of the hollow chamber 12.

Figure 13D:
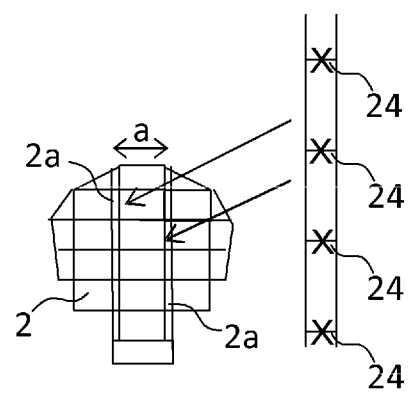

FIG. 13D is an enlarged diagram of a support structure which is arranged inside the hollow chamber 12.

By dividing the support body 2 into a plurality of divided bodies, with the interval a between the weakened parts 2a of the support body 2 set to an interval that is equal to or less than the diameter e of the exit hole 13 of the hollow chamber 12 of the structure 11, it is possible to extract and remove the support body 2 from the exit hole 13, even if the support body 2 is not dissolved completely. Here, in FIGS. 13B and 13D, the portions marked by the X symbol on the drawings are the positions where the narrow bridges 24 are dissolved.

According to the present embodiment, by dividing the support body 2 into a plurality of divided bodies of a size that can pass through the exit hole 13 of the hollow chamber 12 of the structure 11, it is possible to extract and remove the support body via the exit hole 13, even if the support body 2 has not dissolved completely. Furthermore, as stated above, by making the interval a between the weakened parts 2a of the support body 2 smaller than the diameter e of the exit hole 13, it is possible to reliably divide the support body 2 up into blocks and remove the support body 2 via the exit hole 13, whatever the structure adopted for the support structure inside the hollow chamber 12.

The diameter e of the exit hole 13 in the structure 11 may be inserted manually, or may be set automatically in accordance with the shape of the structure. By inputting the set value of the diameter e of the exit hole 13 to the support structure switching determination unit 306 in FIG. 5, it is possible to set a support structure in which weakened parts (cutting lines) 2a are formed at intervals a, corresponding to the diameter e of the exit hole 13, in the support body 2.

Third Embodiment

Below, a third embodiment is described.

In the present embodiment, a method for forming a shaping object by a stacking method using an image forming unit is described. In the present embodiment, the configuration and/or processes which are different to the first and second embodiments are described, and the functions and/or processes that are the same as the first and second embodiments are not described.

Figure 14A:
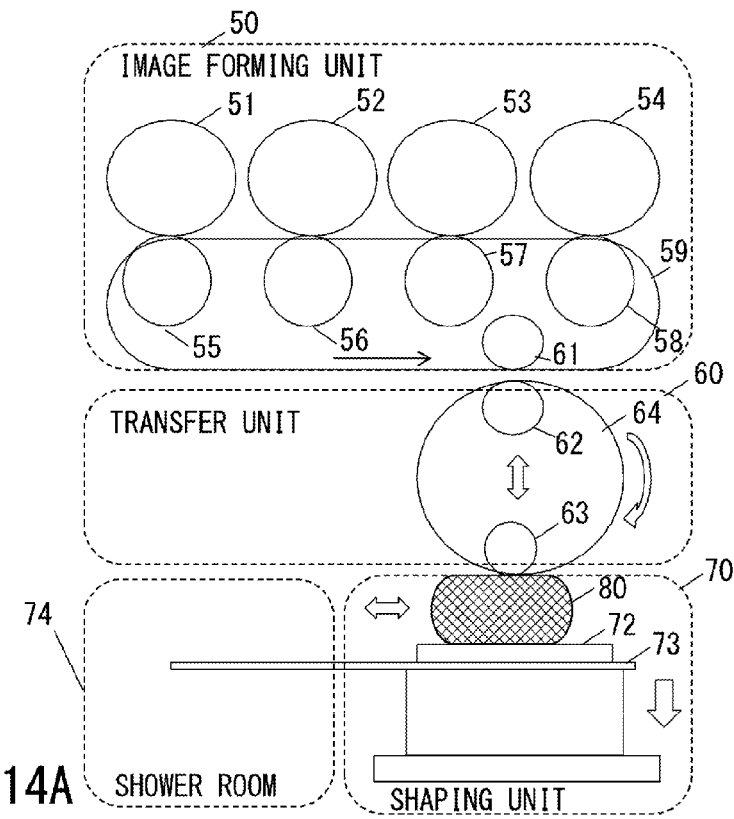
FIG. 14A and FIG. 14B are cross-sectional diagrams showing a schematic configuration of a three-dimensional shaping system according to a third embodiment.
Figure 14B:
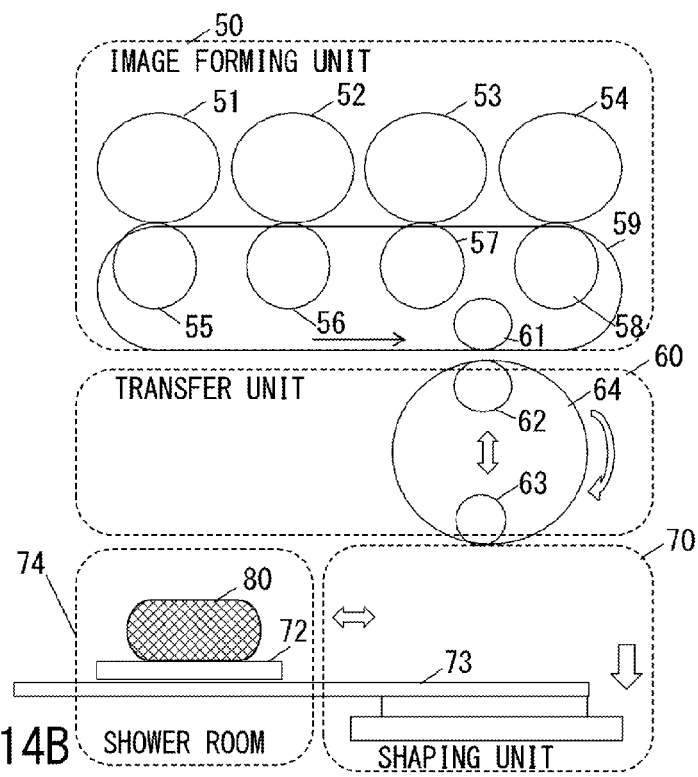

FIG. 14A and FIG. 14B are cross-sectional diagrams showing the approximate configuration of a three-dimensional shaping system according to the present embodiment, in which FIG. 14A shows a state during formation of the shaping object 80, and FIG. 14B shows a state after formation of the shaping object 80.

In FIG. 14A and FIG. 14B, reference numeral 50 is an image forming unit of a three-dimensional shaping system according to the present embodiment. In the image forming unit, layers made of a shaping material are formed using an electrophotographic system.

In the image forming unit 50, a photosensitive drum 51 for particles 1, a photosensitive drum 52 for particles 2, a photosensitive drum 53 for particles 3, and a photosensitive drum 54 for particles 4 are provided along the direction of rotation of an endless first bearing belt 59, the particles 1, 2, 3 and 4 being the shaping material. Furthermore, a transfer roller 55 for the particles 1, a transfer roller 56 for the particles 2, a transfer roller 57 for the particles 3 and a transfer roller 58 for the particles 4 are provided so as to oppose the respective photosensitive drums via the first bearing belt 59. The shaping material referred to here means a material that is used to form a shaping object, and is a term that includes the supporting material and the structural material.

To describe the image forming operation of the image forming unit 50, firstly, images are formed on the photosensitive drums 51 to 54 by exposing the drums by an optical system and supplying the shaping material thereto. The images formed on the respective photosensitive drums are then transferred onto a first bearing belt 59 which is sandwiched between the photosensitive drums and the transfer rollers, thereby forming an image on the first bearing belt 59.

The transfer unit 60 causes the image that has been formed on the first bearing belt 59 in the image forming unit 50 to be transferred to the second bearing belt 64 by the transfer roller 61 on the side of the image forming unit and the transfer roller 62 on the side of the transfer unit.

In the transfer unit 60, the image that has been transferred to the second bearing belt 64 is thermally bonded to a shaping object 80 on a stacking stage 72 in a shaping unit 70, by a heater 63. The stacking stage 72 is configured in such a manner that, during thermal bonding, a stage movement platform 73 can be moved in synchronism with the second bearing belt 64. Furthermore, the stage movement platform 73 is configured so as to descend in the direction of the arrow, in accordance with the stacking thickness.

In the present embodiment, the shaping material is described as particles 1 to particles 4, but a support structure can be formed by using any one of these particles 1 to particles 4 as a material for the support body.

Here, the stacking stage 72 is configured in such a manner that the stage movement platform 73 can be moved in the left/right direction in FIG. 14A and FIG. 14B. Furthermore, as shown in FIGS. 14A and 14B, a shower room 74 is provided on the bottom left-hand part of the three-dimensional shaping system of the present embodiment.

As shown in FIG. 14B, the stacking stage 72 is configured so that it can be positioned inside the shower room 74, by moving leftwards from the position shown in FIG. 14A. The shower room 74 can be sealed off from the other constituent members of the three-dimensional shaping system, by a sealing curtain, or the like.

When shaping has been completed, the shaping object 80 on the stacking stage 72 is moved from the position shown in FIG. 14A to a position inside the shower room 74 as shown in FIG. 14B, and can be washed with a solvent that dissolves the support body, inside the shower room 74.

Figure 15A:
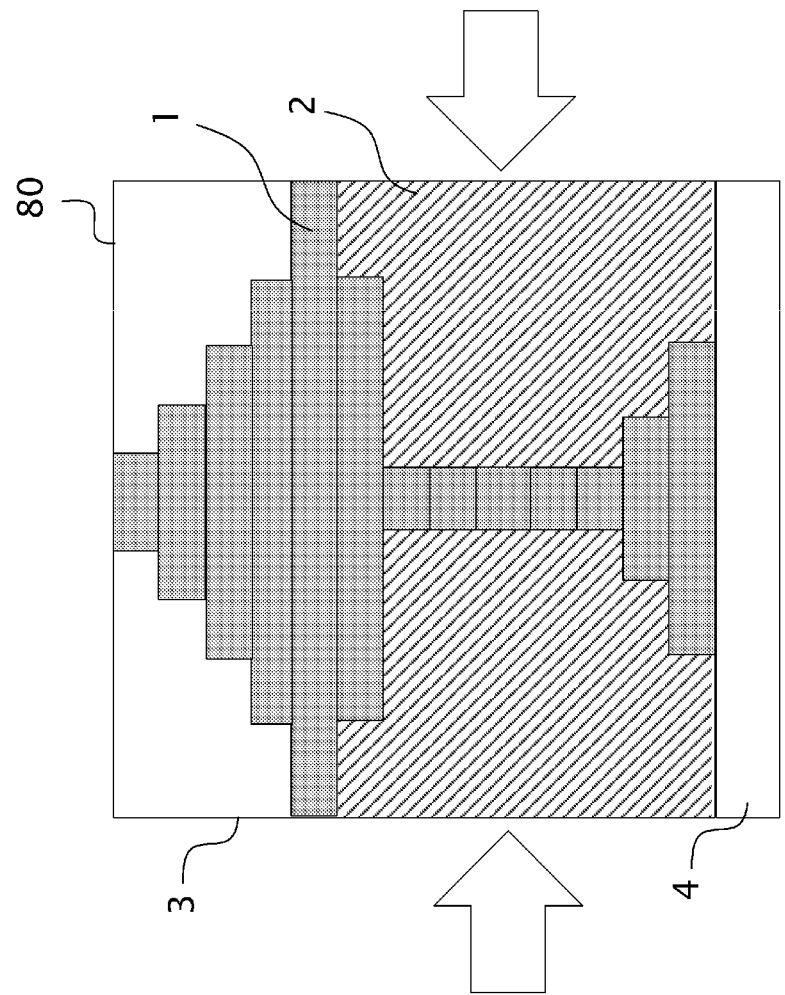
FIG. 15A and FIG. 15B are diagrams showing an example of applying water to a stack shaping object according to the third embodiment.
Figure 15B:
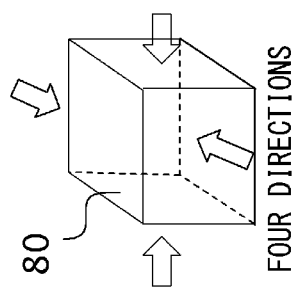

FIG. 15A and FIG. 15B are diagrams showing an example of applying the solvent to the shaping object 80.

FIG. 15A and FIG. 15B show that the flow of liquid onto the shaping object 80 after being formed is in four directions, and FIG. 15A shows a schematic plan view, while FIG. 15B shows a schematic three-dimensional view.

In this way, after completing formation, the support body is softened by applying a flow of liquid from the four directions, left/right and front/rear, onto the shaping object 80 which has been moved to the shower room 74, and the support body is extracted from the shower room 74.

The weakened parts of the support body in the thin bridge structure are already dissolved, and the support body has been divided into a plurality of divided bodies. By removing these divided bodies, it is possible to achieve rapid removal of the support body.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081071, filed on Apr. 10, 2015, which is hereby incorporated by reference herein in its entirety.

What is claimed is:

1. A method for manufacturing a three-dimensional object, the method comprising:
    a step of forming the three-dimensional object including a structure and a support body; and
    a step of removing the support body from the three-dimensional object, wherein
    the step of forming the three-dimensional object comprises:
        a step of generating slice data of the three-dimensional object, and a step of stacking a structural material constituting the structure and a support material constituting the support body based on the slice data, and
    wherein the support body, the support material of which is stacked based on the slice data, has weakened parts for dividing the support body into a plurality of parts.

2. The method for manufacturing a three-dimensional object according to claim 1, wherein in the step of removing the support body from the three-dimensional object, the three-dimensional object is brought into contact with a solvent which dissolves the support material.

3. The method for manufacturing a three-dimensional object according to claim 2, wherein the weakened parts dissolve in a shorter time compared to the plurality of parts.

4. The method for manufacturing a three-dimensional object according to claim 1, wherein the weakened parts are continuously provided in a stacking direction of the support material.

5. The method for manufacturing a three-dimensional object according to claim 4, wherein the support body is formed to have a hanging beam structure including beams parallel to the stacking direction of the support material and beams perpendicular to the stacking direction of the support material, and strength of the weakened parts is lower than that of the plurality of parts.

6. The method for manufacturing a three-dimensional object according to claim 5, wherein the thickness of beams of the weakened parts perpendicular to the stacking direction of the support material is smaller than the thickness of beams of the plurality of parts.

7. A three-dimensional shaping method for forming a three-dimensional object including a structure and a support body which supports the structure, by sequentially stacking a plurality of layers, the method including:
    a step of acquiring cross-section data representing a cross-section of the structure in a target layer;
    a step of determining whether or not a support required region where the support body is to be provided is required in the target layer, on the basis of the cross-section data of the structure in the target layer, and a shape of the structure formed after the target layer; and
    a generation step of, when it is determined that a support required region is required in the target layer, generating support body cross-section data representing a cross-section of a support body arranged in the support required region, and generating slice data of the target layer by adding the support body cross-section data of the support body to the cross-section data of the structure,
    wherein in order to divide the support body into a plurality of parts by weakened parts, support body cross-section data is generated in the generation step, the support body cross-section data including a cross-section part corresponding to the cross-section of the plurality of parts, and a cross-section part corresponding to the cross-section of the weakened parts.

8. The three-dimensional shaping method according to claim 7, wherein the weakened parts have a structure that is more readily dissolved in a solvent that dissolves the support body than the plurality of parts.

9. The three-dimensional shaping method according to claim 7, wherein the support body is formed in a hanging beam structure.

10. The three-dimensional shaping method according to claim 9, wherein the thickness of constituent members of the weakened parts which constitute the hanging beam structure is smaller than the thickness of constituent members of the plurality of parts which constitute the hanging beam structure.

11. The three-dimensional shaping method according to claim 7,
    wherein the structure has a hollow chamber having an opening,
    the support body is arranged inside the hollow chamber when the three-dimensional object is formed, and
    the size of the plurality of parts is smaller than the size of the opening.

12. The three-dimensional shaping method according to claim 11, wherein the opening is an exit hole which is provided in order to remove the support body present inside the hollow chamber after the three-dimensional object is formed.

13. The three-dimensional shaping method according to claim 7, further comprising a stack shaping step of sequentially forming and stacking respective layers made of a shaping material, on the basis of the generated slice data.

* * * * *